United States Patent
Van Woerdekom

(10) Patent No.: US 8,756,678 B2
(45) Date of Patent: Jun. 17, 2014

(54) METHOD FOR VERIFYING THE CERTIFICATION OF A RECORDING APPARATUS

(75) Inventor: Antonie Van Woerdekom, Veldhoven (NL)

(73) Assignee: Robert Bosch GmbH, Stuttgart (DE)

( * ) Notice: Subject to any disclaimer, the term of this patent is extended or adjusted under 35 U.S.C. 154(b) by 24 days.

(21) Appl. No.: 12/934,172

(22) PCT Filed: Mar. 25, 2008

(86) PCT No.: PCT/EP2008/053472
§ 371 (c)(1),
(2), (4) Date: Oct. 27, 2010

(87) PCT Pub. No.: WO2009/118037
PCT Pub. Date: Oct. 1, 2009

(65) Prior Publication Data
US 2011/0040970 A1 Feb. 17, 2011

(51) Int. Cl.
*G06F 21/00* (2013.01)
*H04N 7/18* (2006.01)
*G06F 21/33* (2013.01)
*H04L 9/08* (2006.01)

(52) U.S. Cl.
CPC ............ *H04N 7/18* (2013.01); *G06F 21/33* (2013.01); *H04L 9/0825* (2013.01)
USPC ............. 726/17; 726/10; 713/173; 386/226; D16/203

(58) Field of Classification Search
CPC ................................ G06F 21/33; H04N 7/18
USPC .......................................... 726/10, 17
See application file for complete search history.

(56) References Cited

U.S. PATENT DOCUMENTS

| | | | |
|---|---|---|---|
| 5,625,693 A | 4/1997 | Rohatgi et al. | |
| 2002/0135684 A1 | 9/2002 | Bergen et al. | |
| 2003/0126432 A1 | 7/2003 | Tonisson | |
| 2003/0172317 A1* | 9/2003 | Tsunoda et al. | 714/7 |
| 2005/0078195 A1* | 4/2005 | VanWagner | 348/231.3 |
| 2006/0120237 A1* | 6/2006 | Asano et al. | 369/47.1 |
| 2006/0265329 A1* | 11/2006 | Hug | 705/50 |
| 2007/0061880 A1* | 3/2007 | Depta | 726/20 |
| 2007/0106901 A1* | 5/2007 | Collens et al. | 713/176 |
| 2007/0226412 A1* | 9/2007 | Morino et al. | 711/113 |
| 2007/0276756 A1* | 11/2007 | Terao et al. | 705/51 |
| 2008/0320578 A1* | 12/2008 | Knapp | 726/10 |

FOREIGN PATENT DOCUMENTS

| | | |
|---|---|---|
| EP | 0 752 786 | 1/1997 |
| WO | 2004/027588 | 4/2004 |

OTHER PUBLICATIONS

Rich, "Authentication in Transient Storage Device Attachments", Apr. 2007, pp. 102-104.*

* cited by examiner

*Primary Examiner* — Morshed Mehedi
*Assistant Examiner* — Thaddeus Plecha
(74) *Attorney, Agent, or Firm* — Michael J. Striker

(57) ABSTRACT

A method for verifying the certification of a recording apparatus (14) associated to a control device (12), wherein the control device (12) validates a first certificate written on the recording apparatus (14). Furthermore, a method for identification of a recording apparatus (14), a method for handling a recording apparatus (14), and a recording apparatus for use in connection with a control device (12) are disclosed.

9 Claims, 1 Drawing Sheet

METHOD FOR VERIFYING THE CERTIFICATION OF A RECORDING APPARATUS

TECHNICAL FIELD

The invention provides for a method for verifying the certification of a recording apparatus associated to a control device, a method for identification of a recording apparatus designated for use together with an associated control device, a method for handling a recording apparatus associated to a control device, a recording apparatus, a digital recorder, and a computer program for carrying out the method.

BACKGROUND ART

Using surveillance systems employing digital recorders for recording obtained data it is important to be reliable when making these recordings. This ensures that recordings will always be present whenever an event occurs that requires the recordings to be replayed.

Digital recorders for surveillance systems are equipped with recording media such as USB memory sticks, CD/DVD/Blue-Ray optical disks and state of the art hard disks. Each of these recording media can store recordings of surveyed audio, video and collected metadata.

Generally, a digital recorder consists of a control unit, and one or more recording apparatus. In state-of-the-art digital recorders the recording apparatus is field replaceable. A main technical feature of the recording apparatus is the capability to guarantee reliability of the recordings made by the digital recorder. It should be noted that most recording apparatus have physical moving parts such as hard disks and optical disk drives having moving heads and spindles, USB memory sticks having embedded NAND flash with limited lifetime. These moving parts limit the physical lifetime of the recording apparatus.

During the lifetime of a digital recorder the recording apparatus and its subsystems will have to be replaced. If the recording apparatus is replaced in the field, the digital recorder supplier has to ensure that the replaced recording apparatus has required quality characteristics.

US 2002/0135684 A1 discloses a method of switching between video signals in an image switching apparatus which has a switch for switching between a video signal supplied by a camera and a video signal supplied by a recording apparatus. Furthermore, a circuit for processing the video signal coming from the recording apparatus is provided. The processing circuit compares the video signal coming from the recording apparatus with the video signal supplied by the camera. Afterwards it sets an operating mode on the basis of the comparison result.

DISCLOSURE OF THE INVENTION

According to the method disclosed, the certification of a recording apparatus associated to a control device is verified, wherein the control device validates a first certificate written on the recording apparatus. Thus, a means for any control device is provided to determine if the attached recording apparatus has been released for use in combination with the control device of the control device supplier. This method has the advantage that a digital recorder can verify that the recording apparatus that is part of the digital recorder has been released for use by the digital recorder supplier. It is virtually impossible for third parties to release recording apparatus for use by the digital recorder without permission from the digital recorder supplier.

According to an embodiment, the control device validates the first certificate of the recording apparatus by comparison of the first certificate with a second certificate, e.g. generated by the control device. In this case the control device can use the same algorithm as the control device supplier to generate the certificate.

This certificate can comprise a byte string which in turn can be a concatenation of one or more of the following: control device supplier name, message text, serial number of the recording apparatus, firmware version of the recording apparatus, storage capacity of the recording apparatus, and any other properties of the recording apparatus. The list given above is exemplary and not conclusive.

According to a feature, the first certificate is encrypted and is being decrypted by the control device. Hereby, the control device reads the encrypted certificate from the storage apparatus, and decrypts it using the same encryption algorithm, e.g. the same public-private-key encryption algorithm, as the control device supplier. If the used encryption algorithm is a public-private-key encryption algorithm, the control device uses the same public-private-key encryption algorithm as the control device supplier, except that it uses the public key to decrypt the certificate. If the two certificates match, the control device can use the storage apparatus.

Alternatively, a single key encryption/decryption algorithm can be used. In this case only one key is used for encryption and decryption.

Furthermore, a method for identification of a recording apparatus is provided for use together with an associated control device, wherein a certificate is written or stored, respectively on the recording apparatus. For example, the control device supplier writes an encrypted certificate on each recording apparatus that has been released for use with the control device. In case a public-private-key encryption algorithm is used the control device suppliers encrypts the certificate with the public-private-key encryption algorithm using the private key. Subsequently, the supplier stores the encrypted certificate on the recording apparatus for certification of the recording apparatus at a later date.

This stored certificate is used by the control device to determine if the associated or attached recording apparatus carrying the certificate has been released for use in combination with the control device of the control device supplier. Thereby, the control device can generate a second certificate regularly using the same algorithm as the control device supplier to generate the second certificate. The control device compares the generated second certificate with the certificate written first certificate on the recording apparatus. If the two certificates matches, the control device will use the recording apparatus for recording data and if necessary for reading data stored in the recording apparatus. According to a method for the handling of a recording apparatus associated to a control device, the control device verifies the certification of the recording apparatus using a method according to one of claims 1 to 3 by validating a certificate written on the recording apparatus by a method according to claim 4 before using the recording apparatus. The control device validates the certificate on each recording apparatus before it uses it. If the certificate is invalid, the control device refuses to use it.

The recording apparatus disclosed is for use in connection with a control device, wherein a certificate is written or stored, respectively on the recording apparatus, the certificate can be used to verify the certification of the recording apparatus with regard to the associated control device.

In one embodiment the certificate consists of a byte string. This byte string can be a concatenation of one or more of the following: control device supplier name, message text, serial number of the recording apparatus, firmware version of the recording apparatus, storage capacity of the recording apparatus, and any other properties of the recording apparatus. The list given above is given for illustration purposes and is not conclusive.

According to one feature, the certificate is encrypted. The certificate can be encrypted by a single key encryption/decryption algorithm or by a public-private-key encryption algorithm which makes the method the recording apparatus is used for more secure.

The recording apparatus commonly comprises one or more recording media such as USB memory sticks, CD/DVD/Blue-Ray optical disks and state of the art hard disks. Each of these recording media can store recordings of surveyed audio, video and collected metadata. The recording media given above are only exemplary and the invention is not limited to the media listed above.

The digital recorder according to the disclosure comprises a control device and at least one recording apparatus according to one of claims 6 to 10. This digital recorder is suitable for use in surveillance systems since the digital recorder guarantees reliabiliy of the recordings made and ensures that recordings will always be present whenever an event occurs that requires the recordings to be replayed.

The storage location for the encrypted certificate may be in a file, in a specific sector of the storage apparatus, in a host protected area of the storage apparatus, in the S.M.A.R.T.—log of the storage apparatus or any other convenient location.

The computer program comprises program coding means for carrying out all the steps of a method according to one of claims 1 to 5, when the computer program is run on a computer or a corresponding computing unit.

The coding means can be stored on a computer-readable data carrier for carrying out all the steps of a process according to one of claims 1 to 5, when the computer program is run on a computer or a corresponding computing unit.

All in all, the invention at least in the embodiments provides for a way to guarantee the reliability of recording apparatus used in digital recorders and therefore the invention improves the reliability of recordings made, especially in surveillance systems. Thereby, the invention can be used by any control device.

Further features and embodiments of the invention will become apparent from the description and the accompanying drawings.

It will be understood that the features mentioned above and those described hereinafter can be used not only in the combination specified but also in other combinations or on their own, without departing from the scope of the present invention.

The invention is diagrammatically illustrated in the drawings by means of embodiments by way of example and is hereinafter explained in detail with reference to the drawings. It is understood that the description is in no way limiting on the scope of the present invention and is merely an illustration of embodiments of the invention.

DESCRIPTION OF EMBODIMENTS

Figure 1:
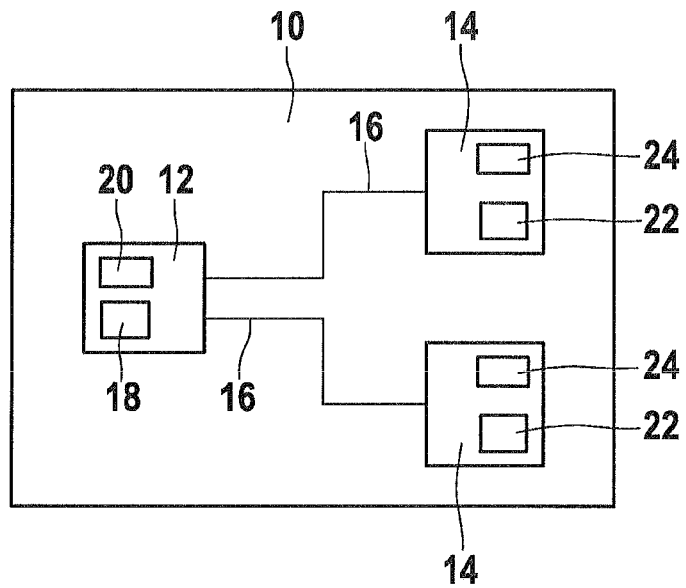
FIG. 1 is a schematical view of an embodiment of the digital recorder according to the invention.

FIG. 1 shows a digital recorder 10 which can be used in a surveillance system, e.g. to record surveyed audio, video and metadata. In doing so it is very important for the digital recorder to be reliable.

The digital recorder 10 comprises a control device 12 and two associated recording apparatus 14. Alternatively, only one or more than two recording apparatus 14 can be provided. Furthermore, two or more control devices 12 can be included in the digital recorder 10. Datalines 16 connect the control device 12 to the recording apparatus 14 for a commonly bidirection communication. The recording apparatus 14 can be embedded in the digital recorder 10, but it may also be an externally attached device, e.g. via USB, SCSI, iSCSI or Ethernet.

The control device 12 comprises a computing unit 18 and a data storage element 20. The data storage element 20 can store a number of keys for encryption and decryption such as private or public keys of a public-private-key encryption algorithm, a key of a single key encryption/decryption algorithm, an algorithm for generating certificates, an algorithm also used by control device suppliers, and/or already generated encrypted or decrypted certificates. The comparison and the encryption and decryption processes can be performed by the computing unit 18.

The certificates which can be generated in the control device 10 or stored in the storage element 20 can be compared with certificates stored in recording apparatus 14 used together with the control device 12.

The recording apparatus 14 shown each comprise a recording medium 22 and a data storage element 24. The data storage elements 24 of the recording apparatus each store the certificate identifying the recording apparatus 14. These certificates, encrypted, decrypted or uncrypted, can be sent to the control device 12 or can be read out by the control device 12.

Figure 2:
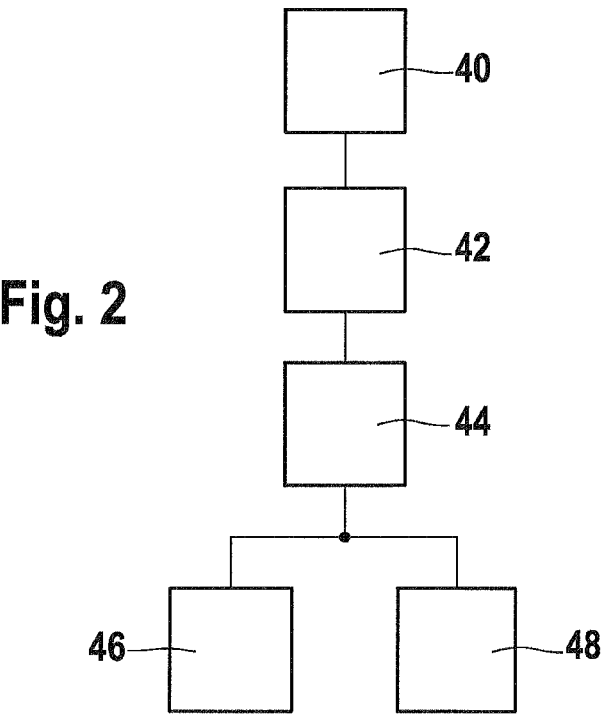
FIG. 2 is a flow chart showing steps of an embodiment of the method according to the invention.

FIG. 2 shows an embodiment of the method described by use of a flow chart. In a first step 40 a control device supplier writes an encrypted first certificate generated by a predefined algorithm in a recording apparatus designated to be used in combination with a control device in a digital recorder of a surveillance system.

In a second step 42 the control device to be used with the said recording apparatus reads out the first certificate in the recording apparatus and generates a corresponding second certificate using the same algorithm as the control device supplier. Alternatively, the second certificate can already be stored in the control device.

Subsequently, the control device decrypts the certificate of the recording apparatus and compares it with the generated second certificate (step 44). If the two certificates match, the control device uses the recording apparatus (step 46). If the certificates do not match, the control device refuses to use the recording apparatus (step 48).

The invention claimed is:

1. A method for verifying the certification of a recording apparatus (14) associated to a control device (12) of a digital recorder (10) of a surveillance system, the method including
upon coupling the recording apparatus to the digital recorder, using the control device (12) to validate a first certificate written and stored on the recording apparatus (14) by a supplier of the control device by comparing the stored first certificate with a second certificate generated by the control device (12), wherein the recording apparatus (14) comprises either a field replaceable optical disk or field replaceable hard disk and wherein the field replaceable optical disk or hard disk is configured to store recordings of surveyed audio, video and collected metadata recorded by the digital recorder of the surveillance system.

2. The method according to claim 1, wherein the first certificate is encrypted and is decrypted by the control device (12) in the step of validating.

3. A method for handling a recording apparatus (14) associated to a control device (12) of a digital recorder (10) of a surveillance system, the method including writing and storing a certificate on the recording apparatus (14) by a supplier of the control device, upon coupling the recording apparatus to the digital recorder, using the control device (12) to verify the certification of the recording apparatus (14) by validating the certificate written on the recording apparatus (14) by comparing the certificate written on the recording apparatus by the supplier of the control device with a second certificate generated by the control device (12), wherein the recording apparatus (14) comprises either a field replaceable optical disk or field replaceable hard disk and wherein the field replaceable optical disk or hard disk is configured to store recordings of surveyed audio, video and collected metadata recorded by the digital recorder of the surveillance system.

4. A recording apparatus for use in connection with a control device (12) of a digital recorder (10) of a surveillance system, the recording apparatus comprising:

a data storage element (24), and a non-transitory recording medium (22), wherein a first certificate is written and stored on the recording medium (22) by a supplier of the control device, wherein upon coupling the recording apparatus (14) to the digital recorder (10), the stored first certificate is used to verify the certification of the recording apparatus (14) with regard to the associated control device (12) by comparing the stored first certificate with a second certificate generated by the control device (12), and wherein the recording apparatus (14) comprises either a field replaceable optical disk or field replaceable hard disk and wherein the field replaceable optical disk or hard disk is configured to store recordings of surveyed audio, video and collected metadata recorded by the digital recorder of the surveillance system.

5. The recording apparatus according to claim 4, wherein the certificate consists of a byte string.

6. The recording apparatus according to claim 5, wherein the certificate is a concatenation of two or more of the following: control device supplier name, message text, serial number of the recording apparatus, firmware version of the recording apparatus, storage capacity of the recording apparatus, and any other properties of the recording apparatus.

7. The recording apparatus according to claim 5, wherein the certificate is encrypted.

8. The recording apparatus according to claim 7, wherein the certificate is encrypted by a public-private-key encryption algorithm.

9. A computer program with program coding means which are stored on a non-transitory computer-readable data carrier, for carrying out all the steps of the method of claim 1, when the computer program is run on a computer or a corresponding computing unit (18).

\* \* \* \* \*